United States Patent [19]

Wendland

[11] 4,224,160
[45] Sep. 23, 1980

[54] BOTTOM LOADED FILTER FOR RADIOACTIVE LIQUIDS

[75] Inventor: William G. Wendland, Enfield, Conn.

[73] Assignee: Combustion Engineering, Inc., Windsor, Conn.

[21] Appl. No.: 967,819

[22] Filed: Dec. 8, 1978

[51] Int. Cl.² ............................................. B01D 27/00
[52] U.S. Cl. .................... 210/236; 210/241; 210/282
[58] Field of Search .......... 176/30; 210/232, 236–238, 210/241, 282; 250/432, 432 PS, 506, 507, 515, 518

[56] References Cited

U.S. PATENT DOCUMENTS

| 3,691,011 | 9/1972 | Kruger et al. | 176/30 |
| 3,838,289 | 9/1974 | White | 250/506 |
| 3,890,233 | 6/1975 | Gischel | 210/237 |

Primary Examiner—Thomas G. Wyse
Assistant Examiner—Richard W. Burks
Attorney, Agent, or Firm—Lombro J. Ristas

[57] ABSTRACT

A bottom loaded filter assembly for filtering radioactive liquids through a replaceable cartridge filter. The filter assembly includes a lead-filled jacket enveloping a housing having a chamber therein for the filter cartridge. A track arrangement carries a hatch for sealing the chamber. A spacer plug supports the cartridge within guide means associated with the inlet conduit in the chamber. The plug and cartridge drop out of the chamber when the hatch is unbolted and move laterally of the chamber. During cartridge replacement, a new plug and cartridge are supported in the guide means by a spacer bar inserted across the track means under the chamber. The hatch is then slid under the chamber and bolted to the vessel, engaging an O-ring to seal the chamber.

16 Claims, 4 Drawing Figures

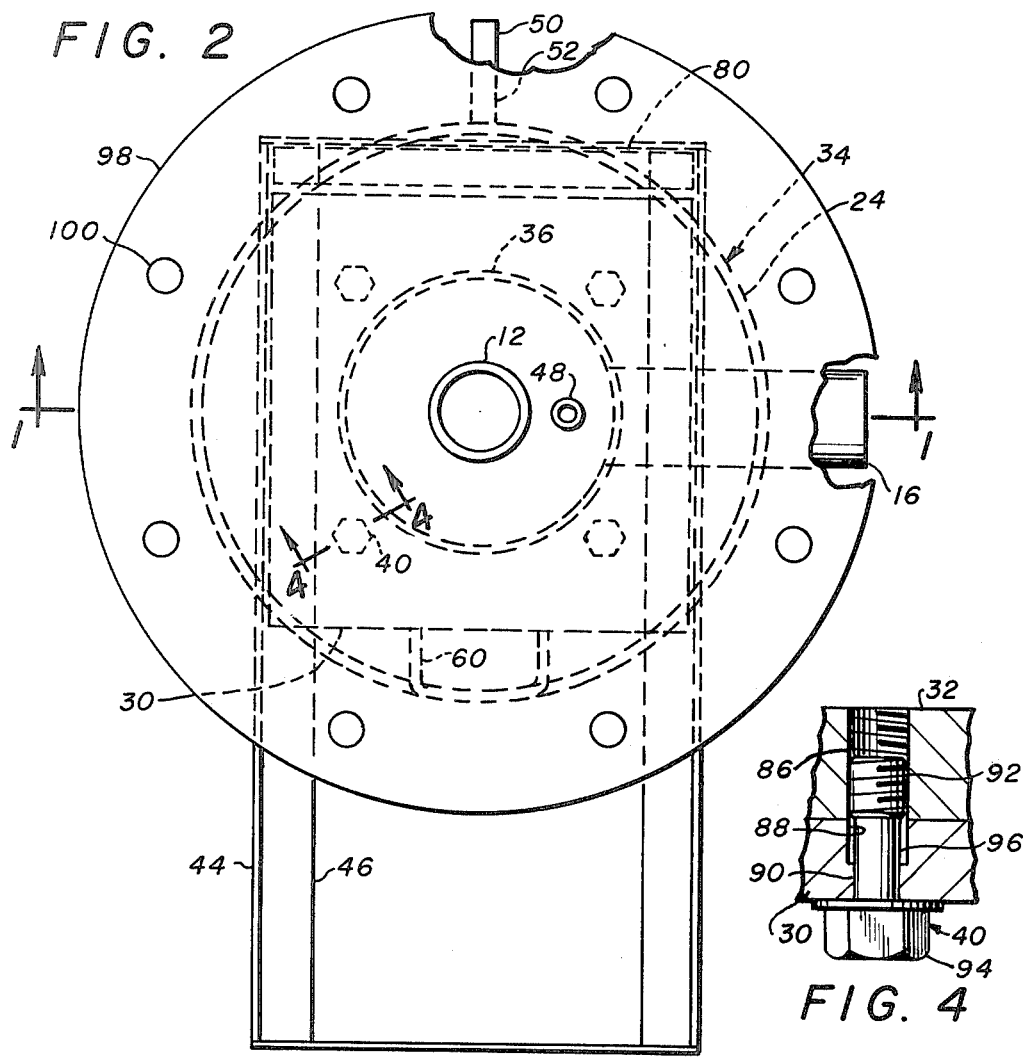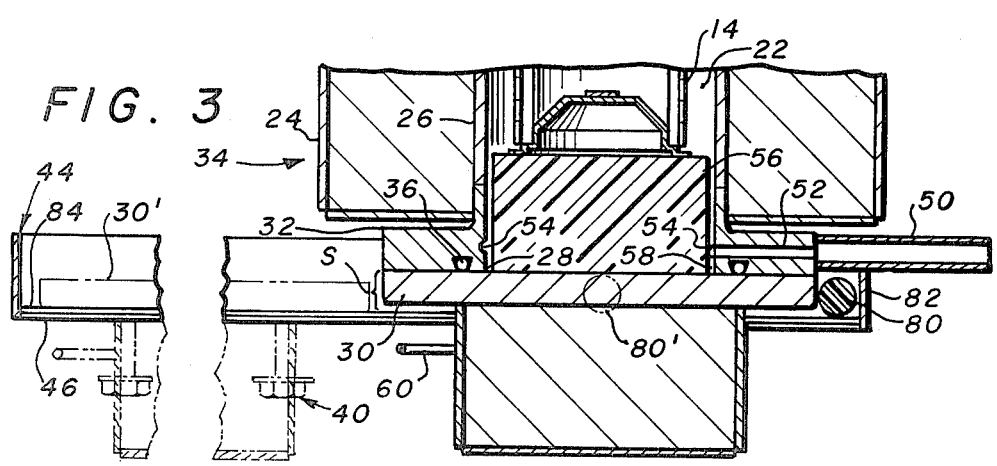

BOTTOM LOADED FILTER FOR RADIOACTIVE LIQUIDS

BACKGROUND OF THE INVENTION

This invention generally relates to equipment for filtering liquids and more particularly to filter assemblies for use with radioactive by-products of nuclear power plants.

Normal operation of a nuclear power plant requires the continuous processing of thousands of gallons of liquids which contain radioactive solids in suspension. These liquids must be filtered so that the liquids may be safely reused and the relatively high radioactivity levels may be confined to isolated portions of the power plant. The most common filtering equipment in use today employs disposable cartridge filters which entrap the radioactive solids during the course of the filtering action and which must be periodically replaced.

The conventional filter assembly for use with disposable cartridges is loaded and unloaded from above the filtering chamber. The filter assembly is usually located below the floor of the power plant and covered with a shield plug forming part of the floor. Since the cartridges become highly radioactive during use, the filter assembly is located within concrete shielded cubicles having a thickness of several feet on all sides. Removal of the spent cartridge begins with removal of the shield plug using an overhead hoist, laying the shield plug aside, and exposing the filter assembly beneath the floor. The operator must remain behind a shield wall to prevent becoming overly exposed to the radiation yielded by the assembly. From behind the shield, the operator must remotely loosen and lift the assembly closure cover. In many plants this operation is remotely performed with long handled tools or hooks and poles. Once the closure cover is opened and open-bottomed shield transfer cask weighing several tons is positioned above the assembly. A cartridge grappling tool is then lowered through the cask to grasp the cartridge. The dripping cartridge is withdrawn into the transfer cask. Upon verification that the cartridge is in the transfer cask, the cask is removed from the access opening, attached to a base, and transferred to a disposal area. It can be appreciated that reloading top loaded filter assemblies is very hazardous and therefore great care must be taken to protect the operator.

Bottom loaded filter assemblies have been proposed for use in nuclear power plants, but these have also been unsatisfactory. Such a filter system has a housing with a bolted-on bottom hatch which closes the bottom of the housing and which functions when in place to mount a filter cartridge inside the housing. The cartridge drops into a shipping cask or receptacle when the hatch is disconnected from the housing and slid transversely thereto. Such prior art units have two major disadvantages. The first is that the housing is typically surrounded by a very thick concrete shield which occupies a large space in the reactor building. Secondly, the means by which the hatch is located under and attached to the housing necessitates many manual operations to unbolt the hatch, align the replacement cartridge filter within the housing, and reattach the hatch. These operations are performed inside the concrete shielding and are very hazardous. Since the liquid to be filtered is under high pressure, ranging from 200 to over 2,000 psi, a very tight seal between the hatch and the housing must be made. Unfastening the many bolts that are provided to keep the filter assembly leak-tight either exposes the workmen to prolonged periods of irridiation, or if performed remotely, cause excessive delay in replacing a filter cartridge.

SUMMARY OF THE INVENTION

Accordingly, it is one object of the invention to provide a compact filter assembly that can be quickly and safely loaded and unloaded without the use of complex remote equipment.

It is another object of the invention to provide a filter assembly that is integrally shielded and does not require external shielding.

It is another object of the invention to provide a filter assembly in which the closure hatch may be automatically aligned to facilitate quick sealing attachment after replacement of the filter cartridge.

It is a further object of the invention to facilitate automatic positioning of the filter cartridge within the filter housing during the replacement operation.

It is another object of the invention to provide a high pressure seal between the housing flange and the hatch that requires relatively few manual operations to be effectuated.

It is still another object of the invention to provide sealing means carried by the housing and hatch respectively, whereby the sealing means are automatically placed in alignment when the hatch is properly positioned with respect to the housing.

According to the invention there is provided a filter assembly comprising a vessel including a lead-filled outer jacket enveloping a housing having a chamber therein for the filter cartridge. The lower portion of the vessel is formed into a flange defining the open lower end of the chamber. Track means are attached to the lower end of the vessel and extend laterally thereto, for carrying a movable hatch adapted to close the chamber opening by engagement with the flange. The hatch is adapted to slide on the track means from a first position directly below the flange to a second position whereby the chamber opening is uncovered. In the closed position the hatch carries a spacer plug which extends upward into the chamber and which supports the filter cartridge in the proper position with respect to the inlet and outlet conduits. To remove a filter cartridge, closure bolts on the underside of the hatch are manually disengaged so that the hatch drops onto the track means. The hatch is then remotely slid into the second position whereby the spacer plug and filter cartridge drop through the chamber into a conventional receptacle which is transported to a disposal area. A new filter cartridge is manually inserted into guide means in the chamber and a new spacer plug is located on the lower end of the cartridge. A spacer bar is placed across the track means to vertically support the spacer plug and filter cartridge. The hatch is moved toward the bar whereby the spacer bar slides out from beneath the spacer plug as the hatch slides into the first position. Stop means at the end of the track means stop the spacer bar such that the spacer bar prevents the hatch from sliding beyond the first position. In this position the hatch vertically supports the plug and cartridge. The vessel flange has captive sealing means carried on its underside and the hatch has captive closure bolts which automatically register with threaded openings in the flange when the hatch is stopped in the first position by contact with the spacer bar. The bolts are then secured and the filter assembly is ready for renewed operation.

BRIEF DESCRIPTION OF THE DRAWINGS

Other objects and advantages of the invention will be evident from the accompanying text and drawings in which:

FIG. 2 is a plan view of the filter assembly prior to mounting on the horizontal support member, with the hatch shown in phantom.

FIG. 3 is a section view along the lines 3—3 of FIG. 1 showing the hatch in the closed position and, in phantom, in the open position; and FIG. 4 is an enlarged section view along the lines 4—4 of FIG. 2.

DESCRIPTION OF THE PREFERRED EMBODIMENT

Figure 1:
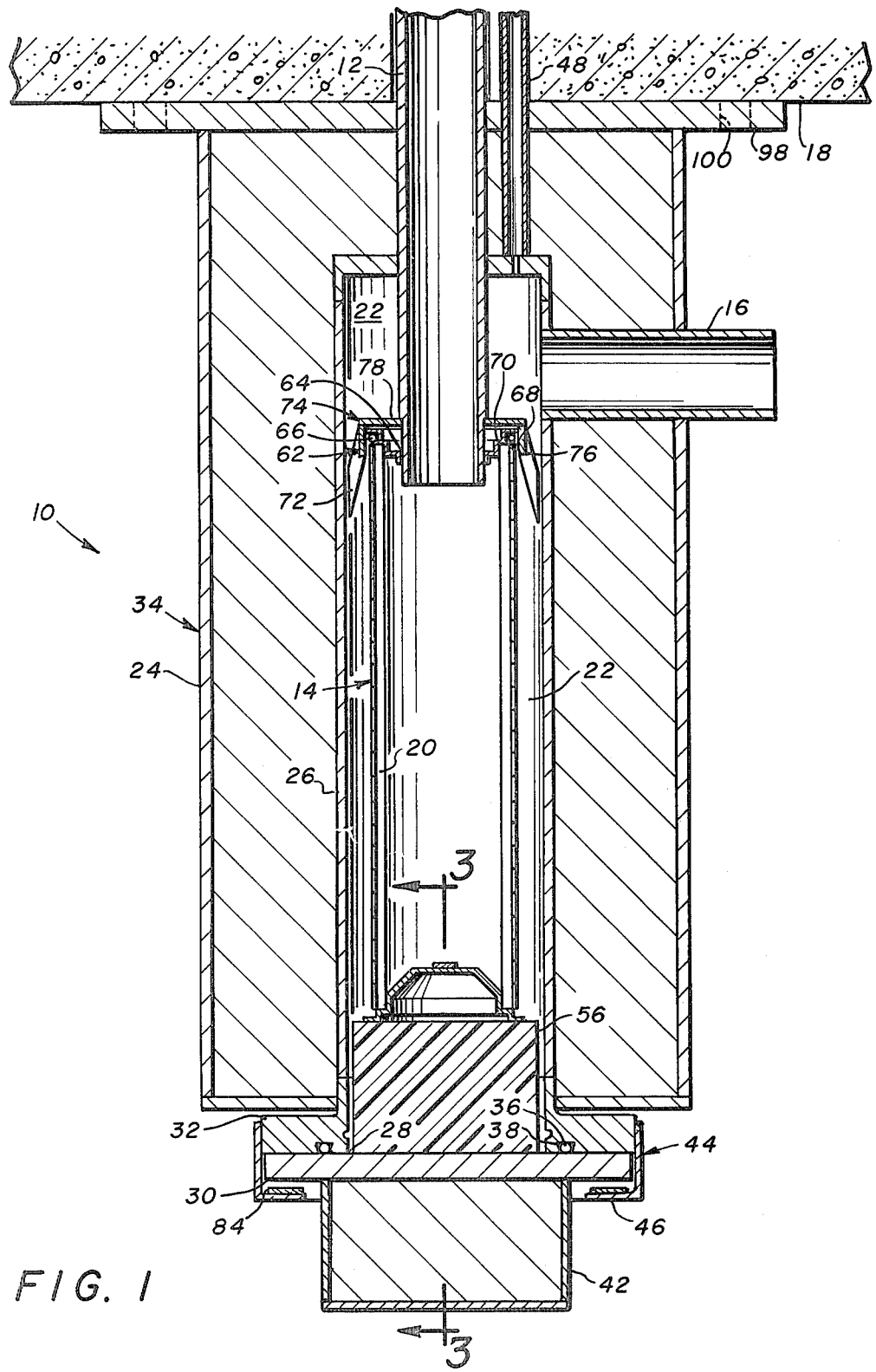
FIG. 1 is a section view of the filter assembly taken along the lines 1—1 of FIG. 2.

FIG. 1 shows the filter assembly 10 arranged to filter radioactive liquid that enters the filter assembly through inlet conduit 12, passes through the filter cartridge 14, and is discharged through outlet conduit 16. In the preferred embodiment the filter assembly 10 is attached to a horizontal support member such as a reinforced concrete floor 18. Beneath the filter assembly 10 a conventional transfer cask arrangement (not shown) is provided to catch the filter cartridge 14 as it drops from the filter assembly 10 and to transport the used cartridge to a remote location for proper disposal.

The filter cartridge 14 is shown in FIG. 1 as a "inside-out" type cartridge where the radioactive liquid to be filtered is deposited on the inside of the cartridge 14, passes through the filtering wall 20 into the chamber 22, and exits through the outlet conduit 16. The invention is not limited to use with inside out cartridges, since, for example, the inlet conduit 12 and outlet conduit 16 could serve as outlet and inlet conduits, respectively, if "outside-in" filters are used. The radioactive liquid is typically at pressures ranging from 200 to 3,000 psi and at temperatures up to about 550° F. Therefore tight seals are required to insure that none of the highly radioactive liquid leaks out of the filter assembly 10. It should also be appreciated that after the cartridge 14 has been in use for some time, the trapped radioactive solids accumulate and produce a very highly radioactive source which must be shielded to protect plant personnel, especially during the filter cartridge changing operation. In typical top or bottom loaded filter arrangements, this protection is provided by concrete shielding several feet thick forming a cubicle around the filter assembly 10.

With the present invention shielding is provided by a stainless steel clad, lead-filled jacket 24 which surrounds the cartridge housing 26 on all sides and above the cartridge 14. The housing 26 defines a chamber 22 which has an opening 28 at the lower end which can be sealed by hatch 30. In the embodiment illustrated in FIG. 1 the chamber opening 28 is defined by flange 32 which is welded with the housing 26. It is contemplated that the flange 32 could also be attached to the jacket 24. The jacket 24, housing 26, and chamber 22 will be referred to collectively as the filter vessel 34.

The seal between the hatch 30 and the flange 32 is provided by an O-ring 36 captively retained in a dovetail groove 38 which is spaced from and completely surrounds the chamber opening 28. The upper surface of the hatch 30 is pressed against the O-ring 36 by the tightening of a plurality of closure bolts 40 (FIG. 2) which are captively retained by the hatch 30. The O-ring provides a tight seal with fewer closure bolts 40, or less torque on each bolt, than is typically used in the prior art. A hatch shield 42 is also lead-filled and has a cross-section larger than that of the chamber 22 whereby the cartridge 14 is shielded from below.

In FIGS. 1, 2 and 3 a guide rail 44 is shown attached to the lower end of the vessel 34 and extending laterally therefrom. The rail 44 has parallel spaced apart tracks 46 located below the outer edges of the hatch 30 and spaced below the hatch when the hatch 30 is secured to the flange 32. The hatch 30 is movable from a first position shown in FIGS. 1, 2 and 3 directly under the chamber 22, to a second position 30' shown in FIG. 3 which uncovers the opening 28 and provides a clear passage through the guide rails 44 whereby the filter cartridge 14 may pass up into or down from the chamber 22.

Several advantages of the filter assembly 10 are best illustrated in FIG. 3 in connection with the following description of how a used cartridge 14 is removed from the filter assembly 10 and a new cartridge installed. Spent cartridge removal begins with proper staging of the area to accommodate handling highly radioactive waste material. The extent to which the area must be staged with the present invention is significantly reduced compared with the prior cartridge replacement procedures because the lead shielding in the jacket 24 and hatch 30 remain around the spent filter cartridge 14 while the filter assembly 10 is being prepared for cartridge removal. With prior systems having concrete cubicles the entire cartridge replacement operation occurs inside the cubicle without any shielding. The filter assembly 10 is secured from service and drained. The inlet conduit 12 and outlet conduit 16 are isolated according to conventional valving, and the vent 48 (shown in FIGS. 1 and 2) is opened to the atmosphere as is the drain line 50. Any residual liquid in the chamber 22 passes out of the filter assembly 10 through the drain line 50. The drain passage 52 extends through the flange 32 and connects the drain line 50 to the chamber 22 by means of drain groove 54 which extends around the circumference of the chamber 22 near opening 28. A spacer plug 56 occupies most of the volume in the lower portion of the chamber 22 and thereby minimizes the amount of the radioactive liquid that remains in the chamber when it is fully drained. The drain grooves 54 assure that the chamber will be drained even if the spacer plug 56 inadvertently blocks the drain passage 52. A small liquid volume will remain in annulus 58 after the vessel has been fully secured from service and drained. When the vessel has been drained, the shipping cask (not shown) is maneuvered directly beneath the opening 28.

After the cask is positioned, the closure bolts 40 are unbolted so that the hatch 30 drops onto the track 46. A small amount of fluid trapped in the annulus 58 may flow when the hatch 30 is unbolted, but this fluid has been filtered and does not pose a significant danger to the operating personnel. This unbolting operation is performed manually since the cartridge 14 is still shielded by jacket 24 and hatch shield 42. The operator then places himself behind a conventional portable shield (not shown) and with the aid of grappling hook (not shown) operated through a hole in the shield, pulls the hatch 30 towards him by means of the handle 60. As the hatch 30 is moved from the first position to the second position 30', the spacer plug 56 is filter cartridge 14 drop through the opening 28 into the shipping cask below. The cask cover is then placed over the cask and the cask is transported to the solid waste handling station. The only remote operation required to get the used cartridge 14 in the shipping cask is the simple pulling on the handle 60.

Referring now to FIG. 1, after the spent cartridge 14 has been removed the vessel 34 is relatively free from radiation and a new cartridge 14 may be inserted with little exposure to the operator. A new cartridge 14 and spacer 56, preferbly made of polyethylene, are inserted by hand through the opening 28 of the vessel 34. The cartridge 14 is automatically aligned by the guide bracket 62. The bracket 62 is shown attached to the inlet conduit 12 but equivalent means fixed with respect to the housing 26 may be suitable for assuring that the cartridge 14 will be properly oriented in the chamber 22 with respect to the inlet and outlet conduits 12, 16. In the preferred embodiment the bracket 62 is adapted to accommodate any of the several cartridge end designs currently available from cartridge suppliers. The typical cartridge 14 has a stepped opening 64 and a flexible O-ring seal 66 carried on either the outer rim 68 as shown, or on the upper surface of one of the steps 70. The guide bracket 62 has a plurality of tapered splines 72 around its circumference (only two shown) which direct the cartridge 14 toward the seal clip 74. The clip 74 has vertical and horizontal portions 76, 78 which serve as the brace against which the cartridge O-ring 66 interacts. In the illustrated embodiment, the vertical portion 76 provides a margin for accommodating variations in the elevation of the O-ring 66 due to variations in the length of the cartridge 14 and spacer plug 56. The O-ring 66 provides a seal for assuring that most of the liquid entering the cartridge 14 from the inlet conduit 12 passes through the filter wall 20 rather than leaking through the connection between the inlet conduit 12 and the cartridge 14. This seal operates by distortion of the O-ring 66 resulting from the differential pressure between the inside and outside of the cartridge 14. Thus the 0-ring 66 automatically separates from the seal clip 74 during the depressurization of the chamber 22 prior to draining. The loosened O-ring 66 therefore does not impede the gravity induced drop of cartridge 14 as described above. The cartridge 14 is more easily inserted into clip 74 and has a greater effective dropping weight if the cartridge 14 is rigidly connected to the spacer plug 56. When the hatch 30 is in the open position, the operator inserting the cartridge 14 need not place his arm up into the chamber 22 but only need apply a vertical lifting force to the underside of the plug 56. In this manner the insertion of the cartridge is not only easy, but the operator avoids the risk of radiation exposure from solids deposited on the housing 26.

Referring again to FIG. 3, the hatch 30' is in the second position and the cartridge 14 and plug 56 are hand-held within the chamber 22. A spacer bar 80' (shown in phantom) is manually placed across the tracks 46 in order to support the spacer plug 56 and cartridge 14 in the chamber 22. The operator removes his hand from the spacer plug 56 and then slides the hatch 30 from the second position 30' to the first position whereby the spacer bar 80' is pushed from under the spacer plug 56 towards the rail stop 82. The diameter of the spacer bar 80 is chosen to automatically position the hatch 30 with respect to the flange 32 when the hatch 30, spacer bar 80 and stop 82 are in contact. The spacer plug 56 is large enough in the vertical direction to assure that the filter cartridge 14 is well within the guide bracket 62 when it is supported by either the spacer bar 80' or hatch 30 resting on the rails 46 below the opening 28. To facilitate movement of the relatively heavy hatch, the tracks 46 may be fitted with low-friction pads 84 to reduce sliding friction. The spacer plug 56 and spacer bar 80 are preferably made of polyethelene which also permits easy sliding and which is resistant to radiation. The distances between the lower surface of the flange 32 and the pads 84 is greater than the thickness of the flange 30 by an amount sufficient to prevent contact of the hatch 30 against the O-rings seals 36 as the hatch 30 is moved between the first and second positions.

FIG. 4 shows another feature of the invention which reduces the amount of time required for performing a cartridge replacement. The closure bolts 40 are captively carried by the hatch 30. The phantom view in FIG. 3 of the hatch 30' in the open position shows two bolts 40 depending in their captured position from hatch 30'. Returning again to FIG. 4, the flange 32 has threaded bores 86 for receiving the bolts 40. The hatch 30 is bored and tapped, the bore 88 being slightly wider than the threaded bore 86 and the lower tapped portion 90 being narrower in order that the threaded tip 92 on the bolt 40 may be captured thereon. The bolt 40 may be permanently removed by unscrewing it through the tapped portion 90. The bolt has a head 94 accessible from beneath the hatch 30 and a narrow shank portion 96 movable through the bore 88 and tap 90. This captive bolt arrangement minimizes the time required to make a cartridge change because the bolts 40 are automatically in register with the threaded bores 86 when the hatch 30 is located in the first position as shown in FIG. 3.

Referring again to FIGS. 1 and 2, the filter assembly 10 is adapted to be connected to the underside of the horizontal floor 18 by means of a mounting plate 98 having a plurality of mounting holes 100 through which suitable holding means can be connected to the floor 18. If additional vertical support is required, conventional bracing can be provided to the vessel jacket 24. A typical filter assembly 10 of the type described above may weigh approximately 5,000 lbs. and require a clear space of approximately 4 ft. by 4 ft. by 8 ft. to facilitate installation and cartridge removal. The assembly may be adapted for use with high-pressure filters (over 2,000 psi) by increasing the thickness rather than the number of closure bolts 40. The preferred embodiment illustrated in FIG. 1 is about 50 inches high from the mounting plate 98 to the lower surface of the hatch shield 42, and the outer diameter of the lead jacket is approximately 20 inches. Approximately 28 inches of clearance is required below the hatch shield 42 in order to permit easy cartridge removal.

It can be seen that the present invention provides compact shielding by the use of a lead jacket 24 integral with the chamber housing 26. Furthermore, the structure provided for sealing the hatch 30 to the flange 32 is easily and quickly operated, and the positioning of the hatch 30 with respect to the flange 32 is easily and precisely accomplished.

What is claimed is:
1. A filter assembly for directing radioactive fluids through a replaceable filter cartridge, comprising:
   a vessel including an outer lead-filled jacket at least partially enveloping a housing having inner walls forming a chamber for containing a removable filter cartridge, the vessel including a rigid flange defining an opening in the lower end of the chamber;

an inlet conduit extending through the vessel and terminating within the chamber;

an outlet conduit extending through the vessel and terminating within the chamber;

rail means connected to the vessel and extending laterally to one side thereof the rail means including track means spaced on either side of the opening and below the flange;

hatch means for engaging the flange to sealingly close the opening, the hatch means including a lower shield and being movable on the track means from a first position directly below the opening to a second position lateral of the opening whereby the filter cartridge may be passed through the track means for insertion and removal in the chamber;

a spacer plug disposed in the lower portion of the chamber and supported therein by the hatch means in the first position, for supporting the filter cartridge within the chamber, the plug being adapted to freely pass through the rail means when the hatch is moved to the second position; and guide means supported in fixed relation to the terminus of one of the conduits for receiving the filter cartridge and properly orienting the cartridge with respect to said one conduit.

2. The filter assembly of claim 1, wherein the guide means includes bracket walls against which the cartridge can be sealed during operation by the pressure differential between the inside and outside of the cartridge.

3. The filter assembly of claim 2, wherein the guide means further includes a plurality of tapered splines for directing the upper end of the cartridge toward the bracket walls.

4. The filter assembly of claim 2, wherein the inlet conduit is located on the longitudinal axis of the chamber and the bracket walls are mounted on the inlet conduit whereby when the filter cartridge is urged into the bracket walls the inlet conduit slides into the filter cartridge.

5. The filter assembly of claim 1, wherein the filter cartridge is fixedly attached to the upper end of the plug.

6. The filter assembly of claim 1, further including a spacer bar having a length sufficient to span the track means below the opening thereby supporting the spacer plug and cartridge filter in the chamber.

7. The filter assembly of claim 6, wherein the spacer bar has a diameter large enough to support the spacer plug such that the upper end of the cartridge filter is within the guide means.

8. The filter assembly of claim 6, wherein the spacer bar is adapted to slide on the track means when the hatch is moved from the second to the first position.

9. The filter assembly of claim 8, wherein the end of the track means closer to the opening includes stop means whereby the hatch may be repeatedly placed in a unique first position on the track means directly under said opening when the spacer bar abuts the stop means and the hatch means.

10. The filter assembly of claim 1, wherein said flange includes captive flexible sealing means completely surrounding the opening.

11. The filter assembly of claim 10, wherein said flexible sealing means is an O-ring suspended in a continuous dove-tail groove on the underside of said flange.

12. The filter assembly of claim 10, wherein the flange has a plurality of internally threaded bores and the hatch means has a plurality of bolts captively retained therein.

13. The filter assembly of claim 12, wherein the leading end of the bolt is threaded and enlarged relative to a narrower shank portion and wherein each bolt is disposed in a double counter-bore in the hatch, the upper counter-bore being larger than the leading end of the bolt and the lower counter-bore being smaller than the leading end of the bolt but larger than the bolt shank and being threaded whereby the leading end of the bolt may screw therethrough.

14. The filter assembly of claim 1, wherein the vessel includes means for attaching said vessel to the bottom of a horizontal support member.

15. A filter assembly of directing radioactive liquid through a replaceable inside out filter cartridge, comprising:

a vessel including an outer lead-filled jacket at least partially enveloping a housing having inner walls forming a chamber, the vessel including a rigid flange defining an opening in the lower end of the chamber, the flange having on its underside a dove-tail groove carrying a flexible O-ring and a plurality of threaded bores surrounding the groove;

an inlet conduit extending through the vessel and terminating within the chamber on the vertical axis thereof;

an outlet conduit extending from the chamber through the vessel;

rail means connected to the vessel and extending laterally to one side thereof, the rail means including track means spaced on either side of the opening and below the flange, the end of the rail means closer to the opening having stop means thereon;

hatch means for sealing the opening, the hatch means including a plurality of bolts captively disposed in double counter-bores in the hatch and adapted to engage the threaded bores on the flange whereby the hatch may be tightened against the O-rings to seal the opening, the hatch means being movable on the track means from a first position directly under the opening to a second position lateral of the opening;

a filter member having a vertically oriented cylindrical cartridge including an inlet opening at the upper end and further including passive sealing means surrounding the inlet opening, the member further including a spacer plug fixedly attached to the bottom of the cartridge for supporting the member from below;

a spacer bar having a length sufficient to span the track means below the opening and being selectively insertable thereunder to support the filter member in the chamber, the bar being adapted to slide on the track means when the hatch is moved from the second to the first position such that the hatch may be repeatedly placed in a unique first position on the track means directly under the opening when the spacer bar abuts the stop means and the hatch means;

guide means supported in fixed relation to the terminus of the inlet conduit and having bracket walls against which the cartridge can be passively sealed during normal filter operation by the pressure differential between the inside and outside of the cartridge, the bracket walls extending vertically to receive the cartridge when the filter member is supported by the spacer bar or hatch.

16. The filter assembly of claim 15 further including drain means extending through the flange into the lower end of the chamber including a drain groove around the circumference of the chamber opening.

* * * * *